Feb. 23, 1943.    G. CAMILLI    2,312,073
ELECTROMAGNETIC INDUCTION APPARATUS
Filed May 24, 1940
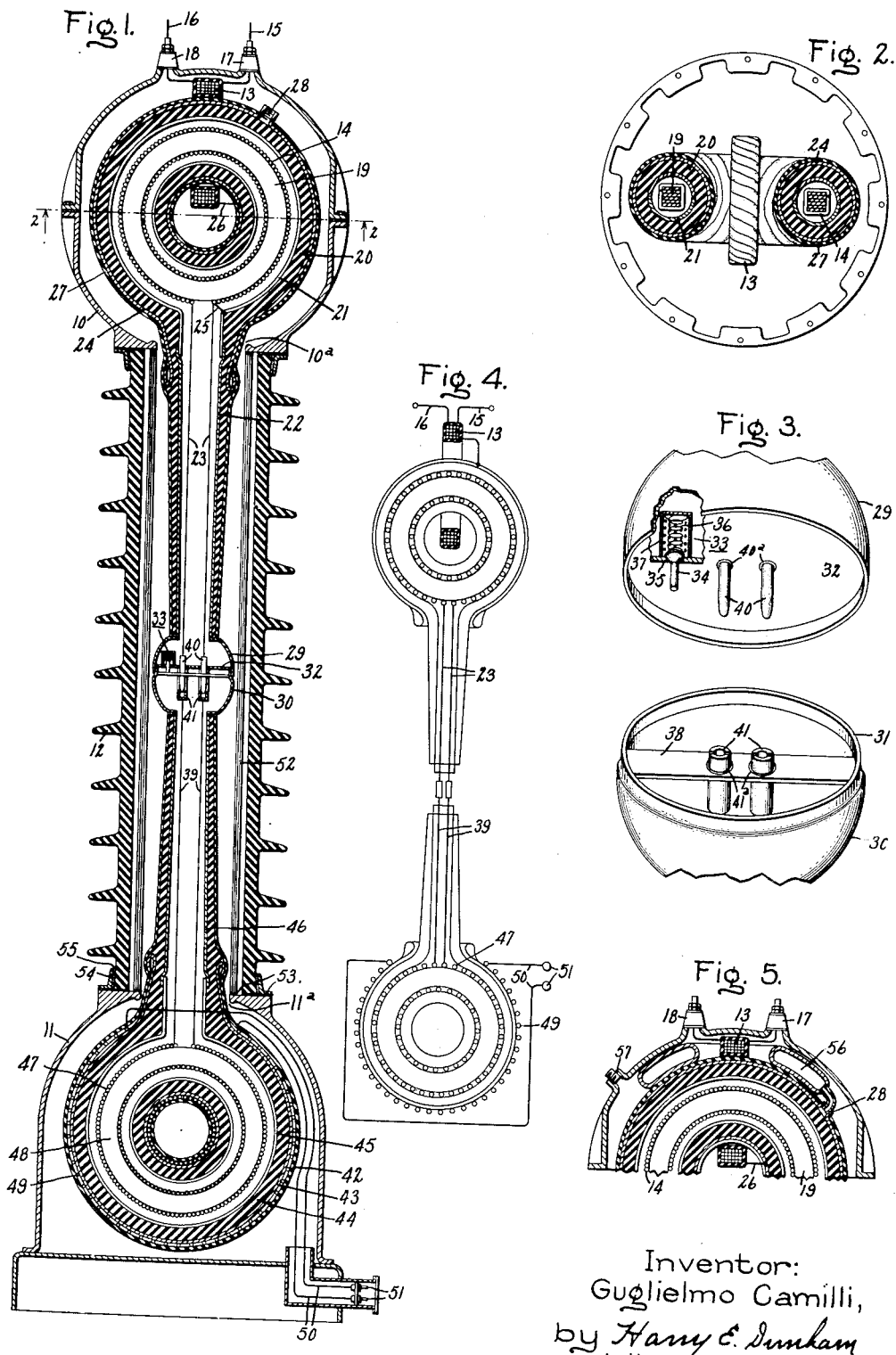
Inventor:
Guglielmo Camilli,
by Harry E. Dunham
His Attorney.

Patented Feb. 23, 1943

2,312,073

UNITED STATES PATENT OFFICE 2,312,073

ELECTROMAGNETIC INDUCTION APPARATUS

Guglielmo Camilli, Pittsfield, Mass., assignor to General Electric Company, a corporation of New York Application May 24, 1940, Serial No. 336,985

21 Claims. (Cl. 175—358)

My invention relates to electromagnetic induction apparatus such as transformers, and although not limited thereto, it has particular application to a current transformer structure having windings connected in cascade. My invention also has features which make it particularly adaptable to high voltage instrument transformers.

An object of my invention is to provide a transformer having such improved structure that a minimum of insulation is needed.

Another object of my invention is to provide a transformer structure which when the windings are connected in cascade will produce an efficient transformer particularly suitable for high voltage application.

Further objects and advantages of my invention will become apparent from the following description referring to the accompanying drawing and the features of novelty which characterize my invention will be pointed out with particularity in the claims annexed to and forming a part of this specification.

In the drawing Fig. 1 is a sectional side elevation of two transformer units connected in cascade and provided with an embodiment of my invention; Fig. 2 is an end elevation in section along the lines 2—2 of Fig. 1; Fig. 3 is a perspective view of the connecting arrangement employed between the top and bottom transformer units illustrated in Fig. 1, one of the units being partly broken away; Fig. 4 diagrammatically illustrates the electrical connections of the transformer units illustrated in Fig. 1, and Fig. 5 is a side elevation of a portion of one of the transformers illustrated in Fig. 1 provided with a modification of my invention.

In the arrangements illustrated in the drawing, I have provided an improved transformer system including a plurality of transformer units, each of the units having a core and a winding suitably insulated, and covered with a fluid or sealed impervious covering, with an insulating fluid contained in the space inside the fluid impervious covering. One of the transformer units has a valve arrangement so as to seal off the unit when it is in its disassembled position, the valve being so constructed and arranged that it will be opened so as to provide a fluid passage between the units when they are in their assembled position. The transformer units when assembled may be suitably encased in a structure which includes metallic casings surrounding the winding portion and a tubular insulating bushing around connecting portions of the units. Since the windings are of much larger dimensions than the connecting portion of each unit, by employing a metallic casing around the windings and an insulating bushing around the relatively narrow connecting portion, I am able to produce a transformer arrangement which will be extremely economical even though designed for high voltage installation.

In order to minimize current creepage along the connecting arrangement between the serially connected transformer units, I may use a suitable insulating fluid inside the encasing structure and outside the impervious covering. If a similar insulating fluid is used inside and outside the sealed impervious covering a suitable connection may be made therebetween. However, that portion of the transformer unit inside the sealed impervious covering may be, if desired, a closed system with respect to the space between the outside of the covering and the surrounding casing, in which case a fluid may be employed outside the covering different from that which is employed inside.

Referring to the drawing, in Figs. 1 and 2 the transformer structure includes a top casing 10 and a bottom casing 11 which are interconnected by a tubular bushing member 12. The top casing 10 and the top half of the bushing 12 surround a transformer unit and the bottom casing 11 and the bottom half of the bushing 12 enclose another transformer unit. For the purposes of identification the transformer unit in the casing 10 and the adjacent half of the bushing 12 will be called the top transformer unit, while the transformer unit enclosed in the casing 11 and the adjacent half of the bushing 12 will be called the bottom transformer unit. It is, however, to be understood that these are not limiting terms, as the transformer structure illustrated in Fig. 1 could equally well be placed in either a horizontal or inverted position. The top and bottom transformer units have many similar structural features, but since they have certain distinct structural features, for reasons which will hereinafter be pointed out, both will be described.

The top transformer unit includes a relatively high tension winding 13 and a relatively low tension winding 14. The high tension winding 13 is connected to high voltage supply lines 15 and 16 through connectors 17 and 18 respectively, which are suitably placed on the top of the casing 10. In order to produce a structure in the top transformer unit which will have a minimum secondary leakage reactance, the secondary coil 14 is distributed around a core member 19. Thus, when the primary winding 13 links or passes through and around the secondary winding 14 the latter acts as a shield to keep the primary leakage flux from the core. Such a structure is desirable since it tends to make the magnetizing current a minimum. The core member 19 may be of any suitable type, such as a stacked laminated core or an annular strip wound core. In order to suitably insulate the primary and secondary windings, insulation 20, which may be of any suitable type, such as paper, is disposed around the secondary winding. So as to space the insulation 20 from the core member 19 and the distributed secondary winding 14, the latter two members are encased in a suitable casing 21. Such a shield or casing is described and claimed in my copending application Serial No. 287,032, filed July 28, 1939, which issued as Patent 2,280,625 on April 21, 1942, and which is assigned to the same assignee as the present invention. The purpose and desirable results obtained by such a structure will become apparent as the following description proceeds. The casing or shield 21 terminates in or is connected with a tubular member 22 and through this tubular member extends terminal leads 23 which are electrically connected with the secondary winding 14. The insulation 20 which surrounds the shield 21 extends to the end of the tubular member 22, it having a decreasing width as it approaches the end of the tubular member 22. Surrounding insulation 20 I provide a second shield or sheath member 24. The shields 21 and 24 may be suitably split so that they will not provide a short circuited path in which induced currents may flow. This shield as well as the tubular member 22 and the surrounding insulation extend through a hole 10a in the casing 10 and into the hollow bushing 12. In order to have the shield 21 at the same potential as the winding 14 it may be electrically connected therewith in any suitable manner, such as by a connector 25 which is electrically connected to the winding 14. The sheath 24 may also be maintained at the potential of the primary winding 13 by connecting it with the latter in any suitable manner, such as by a connector 26. The idea of connecting the sheaths with their adjacent windings is described and claimed in my above-mentioned patent. The shield 21 and tubular member 22 may be perforated so that when any insulating fluid is introduced into the space around the winding 14 and leads 23 this fluid will permeate the solid insulation 20.

In order to keep the amount of fluid insulation which is used in my improved transformer structure to a minimum I surround the insulation 20 and the casing 24 with a fluid or sealed impervious covering 27. The broad idea of so covering a transformer is described and claimed in a copending application Serial No. 288,000, filed August 2, 1939, which issued as Patent 2,297,605 on September 29, 1942, and which is assigned to the same assignee as the present invention. This covering may be of any suitable type, such as tough, resilient composition of polymeric resinous material, such as, for example, plasticized polyvinyl derivatives, derivatives of cellulose, derivatives of polyacrylic acid or substituted polyacrylic acid. The covering may be applied in tape form, sprayed on, or applied in any other suitable manner. This fluid-impervious covering 27 surrounds the transformer unit and extends to the end of the tubular extension 22. A passageway 28, which is a tubular extension integral with the sheath 24, may be provided through the covering 27 so that the space inside the impervious covering may communicate with that outside, when the top unit is in the position as shown in Fig. 1. This passageway 28 may be threaded so as to receive a plug so that the passageway may be closed off during assembly or disassembly. Any suitable insulating fluid may be introduced into the space inside the impervious covering, such as conventional transformer oil or an equivalent, although any suitable gas may be used instead, if desired, such as dichlordifluormethane, commonly known as Freon.

In order that the top transformer unit may be efficiently connected with any other suitable device, such as the bottom transformer unit, I provide an arrangement which includes a connector or coupler 29 at the end of the tubular member 22 remote from the transformer winding 14. This connector 29 is so constructed that it will make a substantially fluid tight joint with a cooperating connector or coupler 30 of the bottom transformer unit. As may be seen in Fig. 3, the connector 30 has a flanged portion 31 whose outside diameter is approximately the same as the inside diameter of the end of the connector 29, so that when the connectors 29 and 30 are pushed together the edge of the connector 29 will telescope tightly over the outside edge of the flanged portion 31, thus making a relatively fluid tight joint. Packing may also be used in this joint, if desired, so as to insure a tight joint and to insulate connectors 29 and 30 from each other. In order that the top transformer unit may be filled with fluid when its connector end 29 is above its coil end, and then inverted to the position as shown in Fig. 1, without allowing the fluid to flow out through the connector end during the assembly operation, I provide a closure member 32 arranged across the open end of the connector member 29. Then in order to be able to have a passageway through the closure member after assembly I provide the connector 29 with a valve arrangement 33 which is carried by the closure member 32. The valve includes a piston portion 34 which cooperates with a stationary valve seat 35 on the closure member 32, the piston portion being biased in fluid tight engagement with the stationary valve seat 35 by means of a spring 36. A perforated casing 37 encloses the spring 36. Thus it will be seen that if the valve is allowed to remain in its normal position the valve seat 35 in the connecting member 29 will be tightly closed and the top unit will be sealed off. The connector 30 of the lower transformer, however, has a bar 38 which spans the entrance thereto and is so placed that when the connecting member 29 telescopes the member 30, the piston valve 34 will abut against the bar 38 and push the piston to an open position against the bias of the spring 36. Thus, when the top transformer is assembled with the bottom transformer in position as illustrated in Fig. 1, a fluid passage will be provided to the lower transformer unit.

The connecting members 29 and 30 in addition to providing a fluid tight joint between the upper and lower transformer units when in assembled position, also have arrangements for electrically connecting the terminal leads 23 of the upper transformer to similar terminal leads 39 of the lower transformer. This is accomplished through a switch mechanism which includes pin type contacts 40 which extend through the closure member 32 and are electrically connected to the leads 23. In order to insulate the contacts 40 from the closure member 32 and to insure a substantially fluid tight connection therebetween, sleeves 40a of suitable material may be placed around the contacts where they pass through the member 32. The bar 38 of the connecting member 30 carries sleeve type contacts 41 which are adapted to receive the pin contacts 40, the contacts 41 being electrically connected to the leads 39 of the lower transformer. These contacts 41 may also be insulated from the bar 38 by sleeves 41a, or the closure member 32 and bar 38 may be made, if desired, of suitable insulating material.

In order to provide the lower transformer unit with a fluid tight covering similar to that around the upper unit, a fluid impervious covering 42, similar to 27 is provided, which extends to the connecting member 30. As with the upper unit, the lower one is also provided with a shield 43 which surrounds insulation 44, the latter surrounding a hollow annular shield member 45 which terminates into a tubular shield member 46. The tubular member 46 and the parts surrounding it extend through a hole 11a in the casing 11. These shields may be suitably split so as to prevent circulating currents therein. The leads 39 which connect the contacts 41 to a primary winding 47 pass through the tubular member 46. This primary winding is spaced from the hollow annular shield member 45 for the same reasons that the winding 14 is spaced from its surrounding shield member 21 in the top unit, and it is distributed around the core member 48 which may be of any suitable type, such as a stacked laminated core or an annular strip wound core.

Since the bottom transformer unit is connected in cascade with the top transformer unit and in order to make the combination as efficient as possible, it is important to keep the impedance of the bottom transformer as small as possible. The smaller the impedance of the bottom transformer the less the exciting current which will be drawn from the top transformer, and the less the exciting current in a transformer the more efficient it becomes. Therefore, in order to minimize the impedance in the bottom transformer a secondary winding thereof is distributed over the primary winding as close to it as possible. Thus a winding 49, which is the secondary or low voltage winding, is distributed around the shield member 43 and inside the covering 42. Such a structure, which provides for a minimum of total impedance of the transformer system, as that employed by the lower transformer, is described and claimed in my above-mentioned Patent 2,280,625. The low voltage winding 49 may be connected to any suitable burden through the leads 50 and terminals 51 which are carried by the casing 11.

I have shown diagrammatically in Fig. 4 the high and low voltage windings and the leads of both the transformer units and have indicated the connection therebetween. Thus it will be seen that the high voltage winding 13 of the top transformer may be connected to high voltage lines 15 and 16, while the low voltage winding of the high voltage transformer may be connected through its leads 23 and the switching mechanism to the leads 39 of the relatively high voltage winding 47 of the bottom transformer, and the relatively low voltage winding 49 may be connected to any suitable burden through the leads 50 and the terminals 51. Since the transformer structure illustrated in Fig. 1 finds an efficient application as an instrument transformer the terminals 51 may connect with any suitable measuring instrument or to an operating winding for any suitable device, such as a relay for a circuit breaker.

The method of assembling the units will be described below, and with this description further advantages of my improved transformer structure will become apparent. The top unit with the winding 14 distributed around the core member 19 is placed inside the hollow annular shield member 21. This may be done in any suitable manner such as by providing the member 21 of two equal halves. The core member and its distributed winding may be spaced from its surrounding annular shield member in any suitable manner such as by providing protrusions which extend radially from the inside surface of the annular member 21. The tubular member 22 with the connector at one end is then passed over the neck portion of the shield member 21 and the unit is then in condition to be insulated.

If the insulation employed is paper it may be applied in any suitable manner, such as by winding strips around the annular and tubular members until the desired thickness is obtained, and shield member 24 is then placed around the insulation. The final covering of the fluid-impervious material is then applied and the primary winding 13 may then be wound around the insulated and covered secondary winding structure.

The lower transformer unit may be assembled by a method similar to that used in connection with the top unit, except that the outside winding is distributed around the outside surface of the sheath, for reasons described above.

The units are now in condition to have the insulating fluid introduced into the space inside the fluid impervious covering. In accomplishing this, it is important to first remove all traces of water or moisture from the insulation, and this may be done by heating the units and introducing an inert gas, such as carbon dioxide. When the units have been properly dried the insulating fluid is slowly introduced until it fills the space inside the shields and tubular member. In order that the insulating fluid may thoroughly penetrate the insulation, the shields and tubular members are perforated and the insulation should therefore be sufficiently porous to permit this penetration. The closure member 32 may be attached to the member 29 after drying and filling, if desired, so as to have a large opening in the unit during these operations. When the units have been properly filled with the insulating fluid they are then in condition to be assembled together. The lower unit is placed inside the casing 11 and the bushing 12 passed around the portion of the lower unit which extends through the hole 11a in the casing. A tubular member 52 of a suitable insulating and fluid impervious material may be inserted inside the bushing 12 so that if any failure occurs in the bushing, the fluid, which as pointed out below is placed around the units and inside the casings and bushing, will not be allowed to escape through the failure. The bushing 12 and cylinder 52 may be held in fluid-tight engagement with the top of casing 11 by gaskets 53. A clamping ring 54 which is attached to the top of the casing 11 is then clamped to the bushing 12 by filling the space 55 between the bushing and annular clamping ring with concrete. The top unit is then inverted and its tubular extension lowered into the top portion of the bushing 12. At this time the connecting members 29 and 30 will move into telescoping engagement so as to provide a fluid tight joint therebetween, and the piston 34 of the valve will be lifted by the bar 38 so that the space inside both transformers will be connected. It will be apparent that the valve performs the functions of keeping the fluid of the top transformer unit from falling out during the assembling operation and providing a fluid passage to the lower unit after assembly. Gaskets and a clamping ring may also be placed between the top of the bushing and the casing 10. A fluid, similar to that used to penetrate the insulation inside the transformer units, may be placed inside the casings 10 and 11 and bushing 12 through the connectors 17 or 18, or in any other suitable manner. A plug which has been used to close the opening 28 of the top transformer is removed since it is, of course, necessary to have the space inside the impervious covers communicate with a small quantity of similar fluid, so as to provide for expansion and contraction of the fluid inside the units. The insulating fluid is placed in the space between the units and the surrounding casing also for the purpose of minimizing current creepage between the connector units 29 and 30 and ground.

If it is desired to use an insulating fluid outside the sealed impervious coverings different from that used inside, a suitable conservator 56, as illustrated in Fig. 5, may be suitably connected to the opening 28 so as to accommodate for expansion and contraction of the fluid inside the impervious coverings. A different fluid may then be placed in the space inside the surrounding casing in any suitable manner such as through a closable opening 57. A suitable fluid for this purpose is a gas, such as the type suggested above, as it will have sufficient dielectric properties to minimize creepage.

In view of the foregoing, it will be seen that I have provided an improved transformer structure which includes a plurality of units, so that when they are of equal size and connected in cascade, the voltage will divide substantially equally therebetween and thereby allow a smaller amount of insulation to be employed with each of the units, than that which would be necessary if only one unit were used. I have illustrated my invention as applied to two units connected in cascade but it is, of course, to be understood that any other suitable number could be so connected. Also with my improved structure a minimum of insulating fluid is employed and, if desired, two distinct fluids may be employed, one inside the unit, and the other outside. An improved and efficient structure has also been described which will allow a transformer unit to be manufactured and completely filled with the insulating fluid before it is assembled with the unit with which it is to be connected. Furthermore, it is to be understood, that although I have described my invention in its application to a transformer system having a plurality of units connected in cascade, features of my invention may also be employed by a single transformer. Thus the valve and electrical connector may be employed to connect a transformer to any other apparatus. Also the plural fluid feature, and a transformer structure embodying that of the top unit may be used with single transformer units thereby providing a transformer which is efficient and insulated to withstand high voltages. Although I have described my invention in relation to transformers, it will be obvious that my invention has application to other suitable electromagnetic induction apparatus.

Modifications of the particular arrangements which I have disclosed embodying my invention will occur to those skilled in the art, so that I do not desire my invention to be limited to the particular arrangements set forth and I intend in the appended claims to cover all modifications which do not depart from the spirit and scope of my invention.

What I claim as new and desire to secure by Letters Patent of the United States is:

1. A high tension transformer system including a plurality of transformer units, each of said units having a winding and a core, a fluid impervious covering means surrounding each of said units, connecting means forming a substantially fluid tight joint between said units when said units are in assembled position, and valve means for sealing off one of said units when in its disassembled position and for providing a fluid passage between said units when they are in their assembled position.

2. A high tension transformer system including a plurality of transformer units, each of said units having a winding and a core, a fluid impervious covering means surrounding each of said units, connecting means forming a substantially fluid tight joint between said units when said units are in assembled position, valve means for sealing off one of said units when in its disassembled position and for providing a fluid passage between said units when they are in their assembled position, and means for electrically connecting said units when they are in assembled position.

3. A high tension transformer system including a plurality of transformer units, each of said units having a winding and a core, connecting means on each of said units, a sealed impervious covering means surrounding each of said units and extending to said connecting means, said connecting means cooperating to form a substantially fluid tight joint between said units when said units are in assembled position, and valve means adjacent said connecting means for sealing off one of said units when in its disassembled position and for providing a fluid passage between said units when they are in their assembled position.

4. A high tension transformer system including a plurality of transformer units, each of said units having a winding and a core, connecting means on each of said units, a sealed impervious covering means surrounding each of said units and extending to said connecting means, said connecting means cooperating to form a substantially fluid tight joint between said units when said units are in assembled position, and valve means carried by said connecting means of one of said units for sealing off said one of said units when in its disassembled position and for providing a fluid passage between said units when they are in their assembled position.

5. A high tension transformer system including a plurality of transformer units, each of said units having a winding and a core, connecting means on each of said units, a sealed impervious covering means surrounding each of said units and extending to said connecting means, said connecting means cooperating to form a substantially fluid tight joint between said units when said units are in assembled position, valve means carried by said connecting means of one of said units for sealing off said one of said units when in its disassembled position and for providing a fluid passage between said units when they are in their assembled position, and switching means carried by said connecting means for electrically connecting said units when they are in their assembled position.

6. A high tension transformer system including a plurality of transformer units, each of said units having a winding and a core, a fluid impervious covering means surrounding each of said units, connecting means forming a substantially fluid tight joint between said units when said units are in assembled position, valve means for sealing off one of said units when in its disassembled position and for providing a fluid passage between said units when they are in their assembled position, and an enclosing structure for said assembled transformer units comprising metallic casings surrounding said units and an insulating member surrounding said connecting means.

7. A high tension transformer system including a plurality of transformer units, each of said units having a winding and a core, a fluid impervious covering means surrounding each of said units, connecting means forming a substantially fluid tight joint between said units when said units are in assembled position, valve means for sealing off one of said units when in its disassembled position and for providing a fluid passage between said units when they are in their assembled position, and insulating fluid in the space within said fluid impervious covering means.

8. A high tension transformer system including a plurality of transformer units, each of said units having a winding and a core, a fluid impervious covering means surrounding each of said units, connecting means forming a substantially fluid tight joint between said units when said units are in assembled position, valve means for sealing off one of said units when in its disassembled position and for providing a fluid passage between said units when they are in their assembled position, insulating fluid in the space within said fluid impervious covering means, and an enclosing structure for said assembled transformer units comprising metallic casings surrounding said units and an insulating member surrounding said connecting means.

9. A high tension transformer system including a plurality of transformer units having a winding and a core, a tube extending from each of said windings and terminating in a connector, terminal leads connected to said windings and extending through said tubes, a fluid impervious covering means surrounding each of said units and tubes and extending to said connectors, said connectors being so arranged that they cooperate to form a substantially fluid tight joint when said units are in assembled position, and valve means for sealing off one of said units when in its diassembled position and for providing a fluid passage between said units when they are in their assembled position.

10. A high tension transformer system including a plurality of transformer units, each of said units having a winding and a core, insulation surrounding said windings, a fluid impervious covering means surrounding each of said insulated units, fluid connecting means forming a substantially fluid tight joint between said units when said units are in assembled position, and an insulating fluid in the space within said impervious covering means.

11. A high tension transformer system including a plurality of transformer units, each of said units having a winding and a core, insulation surrounding said windings, a fluid impervious covering means surrounding each of said insulated units, connecting means forming a substantially fluid tight joint between said units when said units are in assembled position, an insulating fluid in the space within said impervious covering means, and valve means for sealing off one of said units when in its disassembled position and for providing a fluid passage between said units when they are in their assembled position.

12. A high tension transformer system including a plurality of transformer units, each of said units having a winding and a core, insulation surrounding said windings, a fluid impervious covering means surrounding each of said insulated units, connecting means forming a substantially fluid tight joint between said units when said units are in assembled position, an insulating fluid in the space within said impervious covering, an enclosing structure for said assembled transformer units, and an insulating fluid distinct from the fluid within said impervious covering in the space within said enclosing structure and surrounding said assembled units in order to minimize current creepage between the connecting means and ground.

13. A high tension transformer system including a plurality of transformer units, each of said units having a winding and a core, insulation surrounding said windings, a fluid impervious covering means surrounding each of said insulated units, connecting means forming a substantially fluid tight joint between said units when said units are in assembled position, an insulating fluid in the space within said impervious covering, a conservator, a substantially fluid tight connection between said conservator and the space within said impervious covering so as to permit expansion and contraction of the fluid within said covering, an enclosing structure for said assembled transformer units, and an insulating fluid distinct from the fluid within said covering and conservator within said enclosing structure and surrounding said assembled units in order to minimize current creepage between the connecting means and ground.

14. A transformer including a winding, a tube extending from said winding, terminal leads connected to said winding and extending through said tube, a closure member for the end of said tube remote from said winding, a sealed impervious covering means surrounding said winding and tube, said closure member having a fluid valve means and switch means so that said transformer may make fluid and electrical connection with a separate electrical unit.

15. A transformer including a winding, a tube extending from said winding, terminal leads connected to said winding and extending through said tube, a closure member for the end of said tube remote from said winding, a fluid impervious covering means surrounding said winding and tube, and valve means carried by said closure member so that said transformer may make fluid connection with a separate unit.

16. A transformer including a winding, a fluid impervious covering means surrounding said winding, an insulating fluid within said impervious covering, an enclosing structure for said transformer, and an insulating fluid distinct from said first mentioned fluid within said structure and surrounding said transformer in order to minimize current creepage between the transformer and the enclosing structure.

17. A transformer including a winding, a member substantially surrounding said winding, said member being spaced from said winding, solid porous insulation surrounding said member, a fluid impervious covering means surrounding said insulation, and an insulating fluid in the space within said fluid impervious covering, said member being perforated so that said fluid may permeate said insulation.

18. A transformer including a winding, a member substantially surrounding said winding, a tubular member having connection with said member, terminal leads connected to said winding and extending through said tubular member, solid porous insulation surrounding said member and tubular member, a fluid impervious covering means surrounding said insulation, and an insulating fluid in the space within said fluid impervious covering, said member and tubular member being perforated so that said fluid may permeate said insulation.

19. A transformer including a winding, terminal leads extending from said winding, solid porous insulation surrounding said winding and leads, said insulation being spaced from said winding and leads, a fluid impervious covering means surrounding said insulation, a conducting member surrounding said winding and within said fluid impervious covering, and an insulating fluid in the space within said fluid impervious covering, said fluid surrounding said winding and leads and penetrating said insulation.

20. A transformer including relatively high and low voltage windings, an annular core member, solid porous insulation spaced from and surrounding said core member, and insulating fluid in the space around said core member and penetrating said solid porous insulation, said relatively high voltage winding passing through and around said insulated core member, said relatively low voltage winding being distributed around said core member and in the space surrounded by said insulation so as to minimize secondary leakage reactance.

21. An electric apparatus having a winding, a casing surrounding said winding, an insulating fluid within said casing, a second winding magnetically coupled with said first winding and disposed outside said casing, a second casing around said first casing and said second winding, and an insulating fluid distinct from said first-mentioned fluid within said second casing and around said first casing and said second winding.

GUGLIELMO CAMILLI.